United States Patent
Tanimura et al.

(10) Patent No.: US 10,419,117 B2
(45) Date of Patent: Sep. 17, 2019

(54) MONITOR DEVICE AND MONITOR METHOD FOR MONITORING TRANSMISSION LINE

(71) Applicant: FUJITSU LIMITED, Kawasaki-shi, Kanagawa (JP)

(72) Inventors: Takahito Tanimura, Kawasaki (JP); Takeshi Hoshida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/896,152

(22) Filed: Feb. 14, 2018

(65) Prior Publication Data
US 2018/0234184 A1   Aug. 16, 2018

(30) Foreign Application Priority Data

Feb. 16, 2017  (JP) .................................. 2017-026808

(51) Int. Cl.
*H04B 10/2507*  (2013.01)
*H04B 10/079*   (2013.01)
(Continued)

(52) U.S. Cl.
CPC ....... *H04B 10/2513* (2013.01); *H04B 10/079* (2013.01); *H04B 10/0795* (2013.01);
(Continued)

(58) Field of Classification Search
CPC . H04B 10/0795–07953; H04B 10/2507–2572; H04B 10/616–6166
(Continued)

(56) References Cited

U.S. PATENT DOCUMENTS 8,405,511 B2 *   3/2013   Takeshita ......... H04B 10/07953
                                              340/600
2009/0214201 A1 *  8/2009   Oda ................. H04B 10/0795
                                              398/25
(Continued)

FOREIGN PATENT DOCUMENTS

JP  2009-198364   9/2009
JP  2010-050578   3/2010

OTHER PUBLICATIONS

F. N. Hauske et al., "Optical Performance Monitoring in Digital Coherent Receivers", IEEE, Journal of Lightwave Technology, vol. 27, No. 16, pp. 3623-3631 (9 pages), Aug. 2009.
(Continued)

*Primary Examiner* — Li Liu
(74) *Attorney, Agent, or Firm* — Fujitsu Patent Center

(57) ABSTRACT

There is provided a monitor device for monitoring a transmission line including a memory, and a processor coupled to the memory and configured to compensate for a portion of chromatic dispersion on electric signals indicating an electric field component of an optical signal, compensate for deterioration due to a nonlinear optical effect on the electric signals on which the portion of chromatic dispersion is compensated, compensate for a remaining chromatic dispersion except for the portion of chromatic dispersion on the electric signals on which the deterioration due to the nonlinear optical effect is compensated, evaluate quality of the electric signals on which remaining chromatic dispersion except for the portion of chromatic dispersion are compensated, and acquire a first compensation amount of the portion of chromatic dispersion and a second compensation amount of the deterioration due to the nonlinear optical effect, when the evaluated quality satisfies a predetermined condition.

7 Claims, 12 Drawing Sheets

(51) Int. Cl.
  *H04B 10/61* (2013.01)
  *H04B 10/2513* (2013.01)
  *H04B 10/2543* (2013.01)

(52) U.S. Cl.
  CPC ... *H04B 10/07951* (2013.01); *H04B 10/2543* (2013.01); *H04B 10/616* (2013.01); *H04B 10/6161* (2013.01); *H04B 10/6163* (2013.01)

(58) Field of Classification Search
  USPC .......................................... 398/158–160, 208
  See application file for complete search history.

(56) References Cited

U.S. PATENT DOCUMENTS

| | | | | |
|---|---|---|---|---|
| 2010/0046961 | A1* | 2/2010 | Tanimura | H03F 3/08 398/159 |
| 2011/0293270 | A1* | 12/2011 | Takeuchi | H04B 10/25133 398/45 |
| 2013/0004162 | A1* | 1/2013 | Osaka | H04B 10/2572 398/34 |
| 2013/0094851 | A1* | 4/2013 | Xu | H04B 10/07957 398/25 |
| 2013/0148967 | A1 | 6/2013 | Tanimura et al. | |
| 2015/0288458 | A1* | 10/2015 | Honda | H04J 14/02 398/81 |
| 2015/0330835 | A1* | 11/2015 | Yamauchi | G01J 1/44 250/214 C |
| 2016/0050025 | A1* | 2/2016 | Yasuda | H04B 10/6161 398/65 |
| 2016/0056890 | A1* | 2/2016 | Boldicke | H04B 10/0795 398/25 |

OTHER PUBLICATIONS

D. C. Kilper et al., "Optical Performance Monitoring", IEEE, Journal of Lightwave Technology, vol. 22, No. 1, pp. 294-304 (11 pages), Jan. 2004.

EESR—Extended European Search Report dated Jul. 3, 2018 for corresponding European Patent Application No. 18156659.7.

* cited by examiner

FIG. 7

| POSITION | POWER RATIO | | |
|---|---|---|---|
| | CASE(A) | CASE(B) | CASE(C) |
| P1 | 1 | 1 | 1 |
| P2 | 1 | 2 | 0.5 |
| P3 | 1 | 1 | 1 |
| P4 | 1 | 0.5 | 2 |

MONITOR DEVICE AND MONITOR METHOD FOR MONITORING TRANSMISSION LINE

CROSS-REFERENCE TO RELATED APPLICATION

This application is based upon and claims the benefit of priority of the prior Japanese Patent Application No. 2017-026808, filed on Feb. 16, 2017, the entire contents of which are incorporated herein by reference.

FIELD

The embodiments discussed herein are related to a monitor device and a monitor method for monitoring a transmission line.

BACKGROUND

With the increased demand for large capacity data transmission, research and development has been conducted on a digital coherent optical transmission system enabling transmission of, for example, 100 Gbps or more with one wavelength light. Unlike the intensity modulation system, the digital coherent optical transmission system utilizes not only the intensity of light but also the phase of light for signal modulation. An example of such a modulation system may include dual-polarization (DP)-quaternary phase shift keying (QPSK).

A receiving device of the digital coherent optical transmission system digitally and coherently receives an optical signal from a transmission line, converts the optical signal into an electric field signal for each polarization component of the optical signal, and compensates for deterioration due to the chromatic dispersion of the transmission line and the nonlinear optical effect of the transmission line for each electric field signal (see, e.g., Patent Document 1).

As for a transmission line, an optical fiber of, for example, several tens of km to several thousands of km extends between a transmitting device and a receiving device. In maintaining and managing such a transmission line, it is difficult for an operator to check the state of the entire transmission line. Thus, there have been proposed various techniques for monitoring the state of a transmission line (see, e.g., Patent Document 2 and Non-Patent Documents 1 and 2).

Related techniques are disclosed in, for example, Japanese Laid-Open Patent Publication No. 2010-050578 (Patent Document 1) and Japanese Laid-Open Patent Publication No. 2009-198364 (Patent Document 2).

Related techniques are disclosed in, for example, F. N. Hauske et al., "Optical Performance Monitoring in Digital Coherent Receivers," IEEE JLT 27, 16, pp. 3623-3631, 2009 (Non-Patent Document 1) and D. C. Kilper et al., "Optical Performance Monitoring," IEEE JLT 22, 1, pp. 294-304, 2004 (Non-Patent Document 2).

SUMMARY

According to an aspect of the invention, a monitor device for monitoring a transmission line includes a memory, and a processor coupled to the memory and the processor configured to compensate for a portion of chromatic dispersion on a plurality of electric signals indicating an electric field component of an optical signal received by a digital coherent reception from the transmission line, compensate for deterioration due to a nonlinear optical effect on the plurality of electric signals on which the portion of chromatic dispersion is compensated, compensate for a remaining chromatic dispersion except for the portion of chromatic dispersion on the plurality of electric signals on which the deterioration due to the nonlinear optical effect is compensated, evaluate quality of the plurality of electric signals on which remaining chromatic dispersion except for the portion of chromatic dispersion are compensated, and acquire a first compensation amount of the portion of chromatic dispersion and a second compensation amount of the deterioration due to the nonlinear optical effect, when the evaluated quality satisfies a predetermined condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a table illustrating the ratio of power of an optical signal for each position;

DESCRIPTION OF EMBODIMENTS

According to the technique disclosed in Non-Patent Document 1, the tap coefficient of an adaptive equalizer which processes an optical signal in a receiving device and the sum of physical effects of each section obtained by dividing a transmission line by a relay node (an optical amplifier or the like) are used for monitoring. As a result, the state of each section of the transmission line may not be monitored in some cases even though the comprehensive state of the transmission line may be monitored. The above-mentioned term "section" may be called, for example, "span."

According to the technique disclosed in Non-Patent Document 2, a monitor device is provided for each section of a transmission line, and each monitor device may monitor the state of each section by extracting an optical signal from the transmission line. However, with this technique, it is necessary to install a number of monitor devices on the transmission line, which may result in an increase in the costs.

Figure 1:
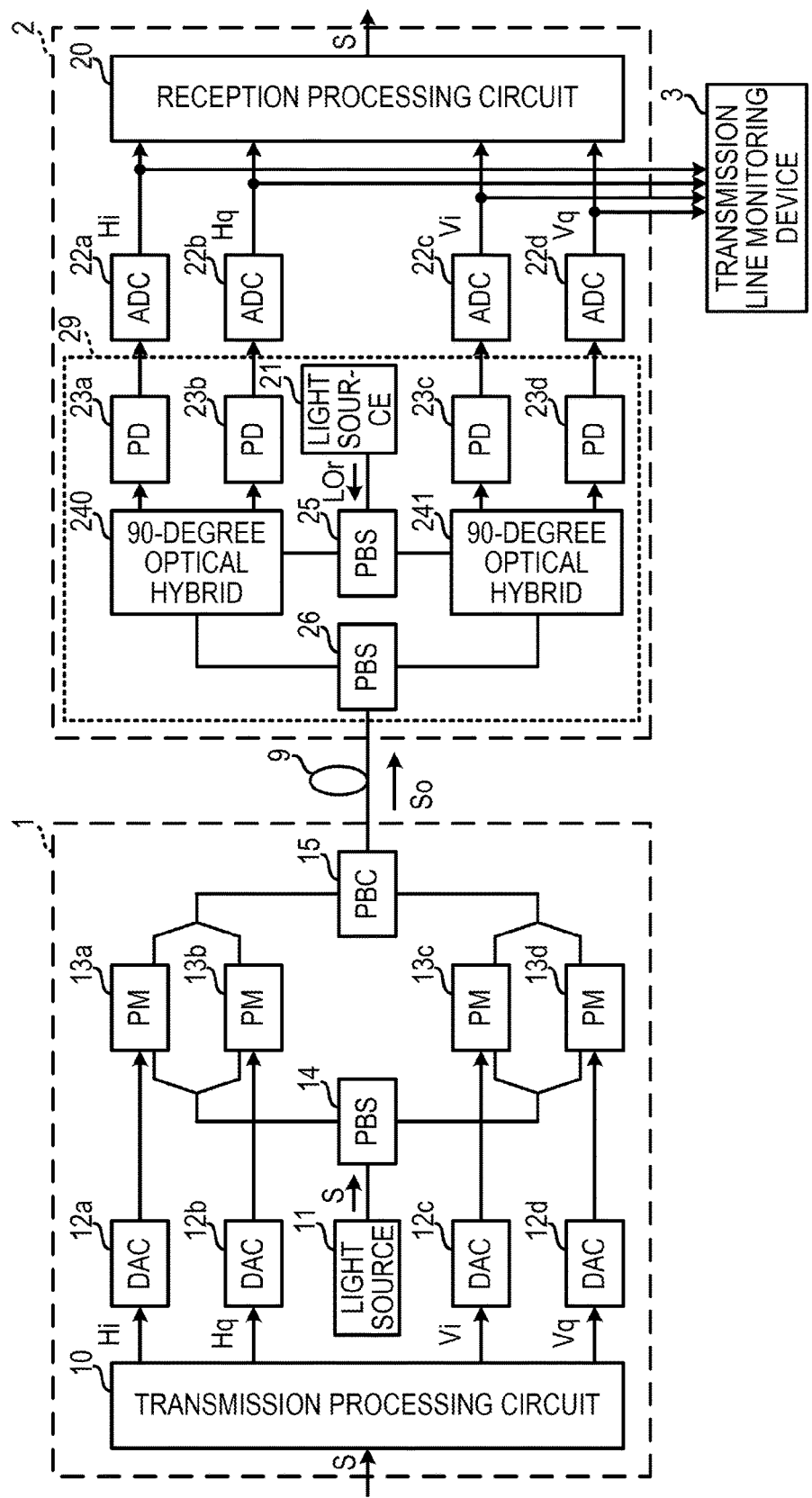
FIG. 1 is a block diagram illustrating an example of the configuration of a transmission system of a digital coherent optical transmission system.

Embodiments of a technique capable of monitoring the state of a transmission line for each section of the transmission line will be described in detail below with reference to the drawings. FIG. 1 is a block diagram illustrating an example of the configuration of a transmission system of a digital coherent optical transmission system. The transmission system includes a transmitting device 1 that transmits an optical signal So to a transmission line 9, a receiving device 2 that receives the optical signal So via the transmission line 9, and a transmission line monitoring device 3 that monitors the state of the transmission line.

The transmitting device 1 includes a transmission processing circuit 10, a light source 11, and digital-to-analog converters (DACs) 12a to 12d. The transmitting device 1 further includes phase modulators (PMs) 13a to 13d, a polarization beam splitter (PBS) 14, and a polarization beam combiner (PBC) 15.

The transmission processing circuit 10 divides an electrical signal S input from another device into a plurality of sub-channels having different center frequencies and multiplexes the plurality of sub-channels to generate a multiplexed signal. The transmission processing circuit 10 separates the generated multiplexed signal into four digital signals Hi, Hq, Vi, and Vq which are then output to the DACs 12a to 12d. An example of the transmission processing circuit 10 may include, but is not limited to, a digital signal processor (DSP), a field programmable gate array (FPGA) or an application specific integrated circuit (ASIC).

The DACs 12a to 12d convert the digital signals Hi, Hq, Vi, and Vq into analog signals, respectively. The analog signals are input to the PMs 13a to 13d, respectively. The DACs 12a to 12d may be incorporated in the transmission processing circuit 10.

The light source 11 is, for example, a laser diode (LD) and outputs light S having a predetermined frequency to the PBS 14. The PBS 14 separates the light S into an H axis and a V axis (polarization axes). The H axis component of the light S is input to the PMs 13a and 13b, and the V axis component of the light S is input to the PMs 13c and 13d.

The PMs 13a to 13d optically modulate the analog signals from the DACs 12a to 12d. More specifically, the PMs 13a and 13b phase-modulate the H axis component of the light S based on the analog signals from the DACs 12a and 12b, and the PMs 13c and 13d phase-modulate the V axis component of the light S based on the analog signals from the DACs 12c and 12d. The phase-modulated H axis component and V axis component of the light S are input to the PBC 15. The PBC 15 polarization-combines the phase-modulated H axis component and V axis component of the light S, and outputs a polarization-combined signal to the transmission line 9 as the optical signal So.

The receiving device 2 includes a reception processing circuit 20, a receiver 29, and analog-to-digital converters (ADCs) 22a to 22d. The receiver 29 includes a light source 21, photodiodes (PDs) 23a to 23d, 90-degree optical hybrid circuits 240 and 241, and PBSs 25 and 26, and digital-coherently receives the optical signal So from the transmission line 9. The PBS 26 separates the optical signal So input from the transmitting device 1 via the transmission line 9 into an H axis component and a V axis component which are then output to the 90-degree optical hybrid circuits 240 and 241, respectively.

The light source 21 inputs local light emission LOr of the transmitting device 1 to the PBS 25. The PBS 25 separates the local light emission LOr into an H axis component and a V axis component which are then output to the 90-degree optical hybrid circuits 240 and 241, respectively.

The 90-degree optical hybrid circuit 240 has a waveguide for causing the H axis component of the optical signal So and the H axis component of the local light emission LOr to interfere with each other, and detects the H axis component of the optical signal So. The 90-degree optical hybrid circuit 240 outputs optical electric field components corresponding to the amplitudes and phases of an I channel and a Q channel to the PDs 23a and 23b, respectively, as a result of the detection.

The 90-degree optical hybrid circuit 241 has a waveguide for causing the V axis component of the optical signal So and the V axis component of the local light emission LOr to interfere with each other, and detects the V axis component of the optical signal So. The 90-degree optical hybrid circuit 241 outputs optical electric field components corresponding to the amplitudes and phases of an I channel and a Q channel to the PDs 23c and 23d, respectively, as a result of the detection.

The PDs 23a to 23d convert the input optical electric field components into electric signals which are then output to the ADCs 22a to 22d, respectively. The ADCs 22a to 22d convert the electric signals input from the PDs 23a to 23d into digital signals Hi, Hq, Vi, and Vq, respectively. The digital signals Hi, Hq, Vi, and Vq are input to the reception processing circuit 20.

The reception processing circuit 20 combines the digital signals Hi, Hq, Vi, and Vq to obtain a multiplexed signal, performs compensation such as chromatic dispersion and phase rotation of the transmission line 9 for the multiplexed signal, and extracts a signal for each sub-channel multiplexed with the multiplexed signal. The reception processing circuit 20 generates an electric signal S from the signal of each sub-channel. An example of the reception processing circuit 20 may include, but is not limited to, a DSP, a FPGA or an ASIC.

The digital signals Hi, Hq, Vi, and Vq are branched in the middle of the transmission line toward the reception processing circuit 20 and are input to the transmission line monitoring device 3.

The transmission line monitoring device 3 is connected to the receiving device 2 via, for example, an electric cable or an electrical connector and monitors the state of the transmission line 9 based on the digital signals Hi, Hq, Vi, and Vq input from the receiving device 2. The digital signals Hi, Hq, Vi, and Vq are an example of a plurality of electric field signals indicating the optical electric field components of the optical signal So.

Figure 2:
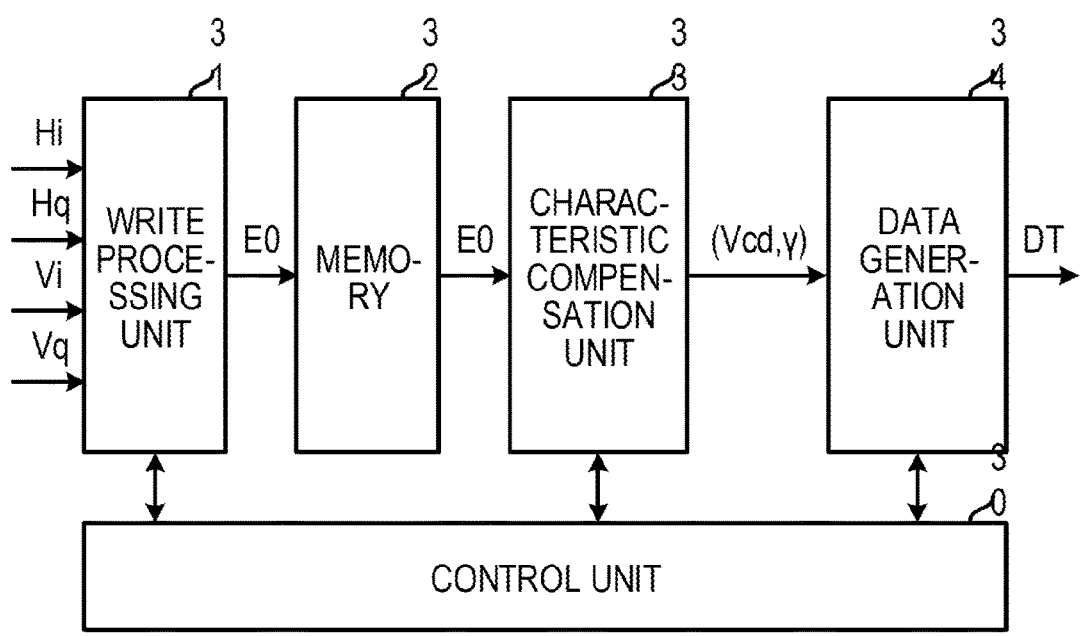
FIG. 2 is a block diagram illustrating an example of the configuration of a transmission line monitoring device.

FIG. 2 is a block diagram illustrating an example of the configuration of the transmission line monitoring device 3. The transmission line monitoring device 3 includes a control unit 30, a write processing unit 31, a memory 32, a characteristic compensation unit 33, and a data generation unit 34. The write processing unit 31 is configured by hardware such as a FPGA. The control unit 30, the characteristic compensation unit 33, and the data generation unit 34 are configured by, for example, hardware such as a FPGA or an ASIC, software functions driving a processor such as a central processing unit (CPU), or a combination of hardware and software.

The write processing unit 31 and the memory 32 are an example of a holding unit, and acquire and hold the digital signals Hi, Hq, Vi, and Vq from the receiver 29. More specifically, the digital signals Hi, Hq, Vi, and Vq are input from the ADCs 22a to 22d to the write processing unit 31. The write processing unit 31 generates a signal E0 from the digital signals Hi, Hq, Vi, and Vq and writes the signal E0 in the memory 32. At this time, the write processing unit 31 generates the signal E0 for the time necessary for monitoring the state of the transmission line 9. The signal E0 corresponds to the above-mentioned multiplexed signal.

A signal value of the signal E0 is stored in the memory 32. That is, the memory 32 holds the signal E0.

The characteristic compensation unit 33 reads the signal E0 from the memory 32 and compensates for deterioration due to the chromatic dispersion of the transmission line 9 and the nonlinear optical effect of the transmission line 9 for the signal E0. At this time, the characteristic compensation unit 33 may process the signal E0 at a speed slower than a writing speed (writing clock frequency) of the write processing section 31.

The characteristic compensation unit 33 detects the state of the transmission line 9 from each compensation amount for the signal E0. More specifically, the characteristic compensation unit 33 acquires the relationship between the compensation amount of chromatic dispersion (hereinafter referred to as "chromatic dispersion compensation amount") Vcd when the quality of the signal E0 is the best and the compensation amount of deterioration due to the nonlinear optical effect (hereinafter referred to "nonlinear compensation amount") γ, and outputs the relationship to the data generation unit 34.

As will be described later, the data generation unit 34 is configured by, for example, a deep neural network, and converts data (Vcd and γ) input from the characteristic compensation unit 33 according to a predetermined conversion rule to generate data DT of a format which may be easily analyzed. The data DT is generated in a format corresponding to a target (for example, network control software or network administrator) using the monitoring result of the transmission line 9. Therefore, the data generation unit 34 may improve the convenience of the transmission line monitoring device 3. The data generation unit 34 is an example of a generation unit.

The control unit 30 controls the write processing unit 31, the characteristic compensation unit 33, and the data generation unit 34 to monitor the transmission line 9. For example, the control unit 30 performs various settings and operation instructions according to a predetermined sequence for the write processing unit 31, the characteristic compensation unit 33, and the data generation unit 34.

Figure 3:
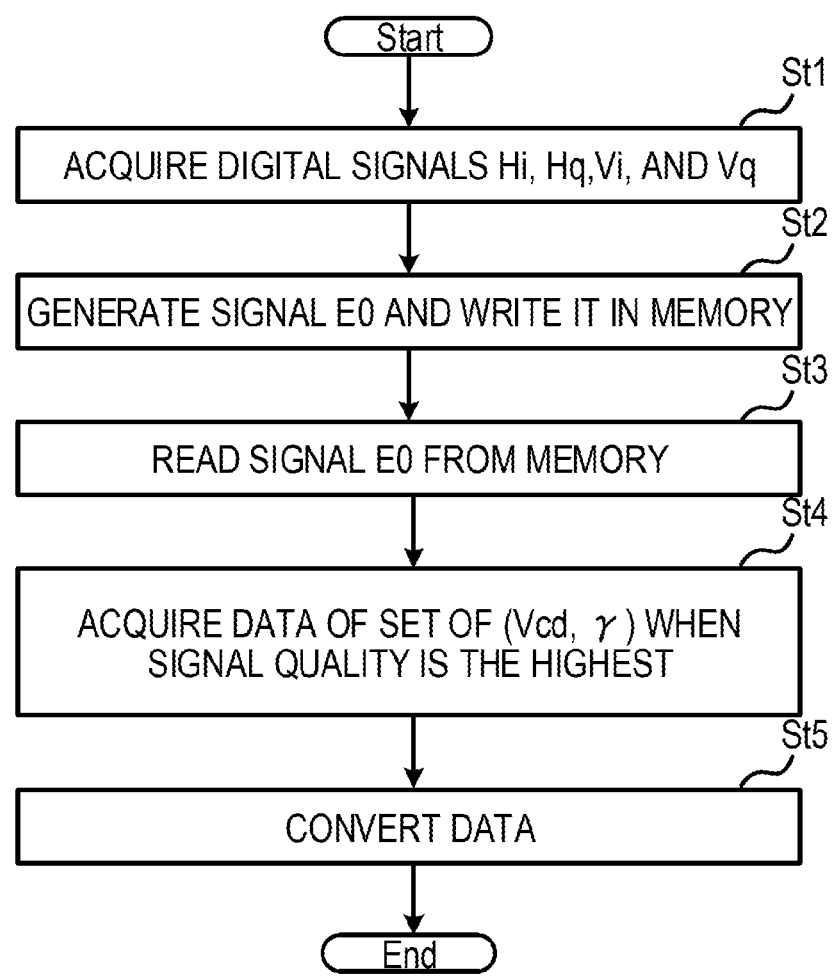
FIG. 3 is a flowchart illustrating an example of the operation of the transmission line monitoring device.

FIG. 3 is a flowchart illustrating an example of the operation of the transmission line monitoring device 3. This operation is sequentially executed according to an instruction from the control unit 30 to the write processing unit 31, the characteristic compensation unit 33, and the data generation unit 34.

The write processing unit 31 acquires the digital signals Hi, Hq, Vi, and Vq from the receiver 29 which digital-coherently receives the optical signal So (operation St1). Next, the write processing unit 31 generates the signal E0 from the digital signals Hi, Hq, Vi, and Vq and writes the signal E0 in the memory 32 (operation St2).

Next, the characteristic compensation unit 33 reads the signal E0 from the memory 32 (operation St3). At this time, since the reading speed of the characteristic compensation unit 33 is slower than the writing speed of the write processing unit 31, the signal processing speed is converted by the memory 32.

Next, the characteristic compensation unit 33 compensates for deterioration due to the chromatic dispersion and the nonlinear optical effect for the signal E0 to acquire data of a set of the chromatic dispersion compensation amount Vcd when the quality is the highest and the nonlinear compensation amount γ (operation St4). The contents of the process of the operation St4 will be described later.

Next, the data generation unit 34 converts the data (Vcd and γ) input from the characteristic compensation unit 33 according to a predetermined conversion rule (operation St5). As a result, the data DT of a format that may be easily analyzed is generated. The transmission line monitoring device 3 operates in this way.

Next, the characteristics of the transmission line 9 connecting the transmitting device 1 and the receiving device 2 will be described.

Figure 4:
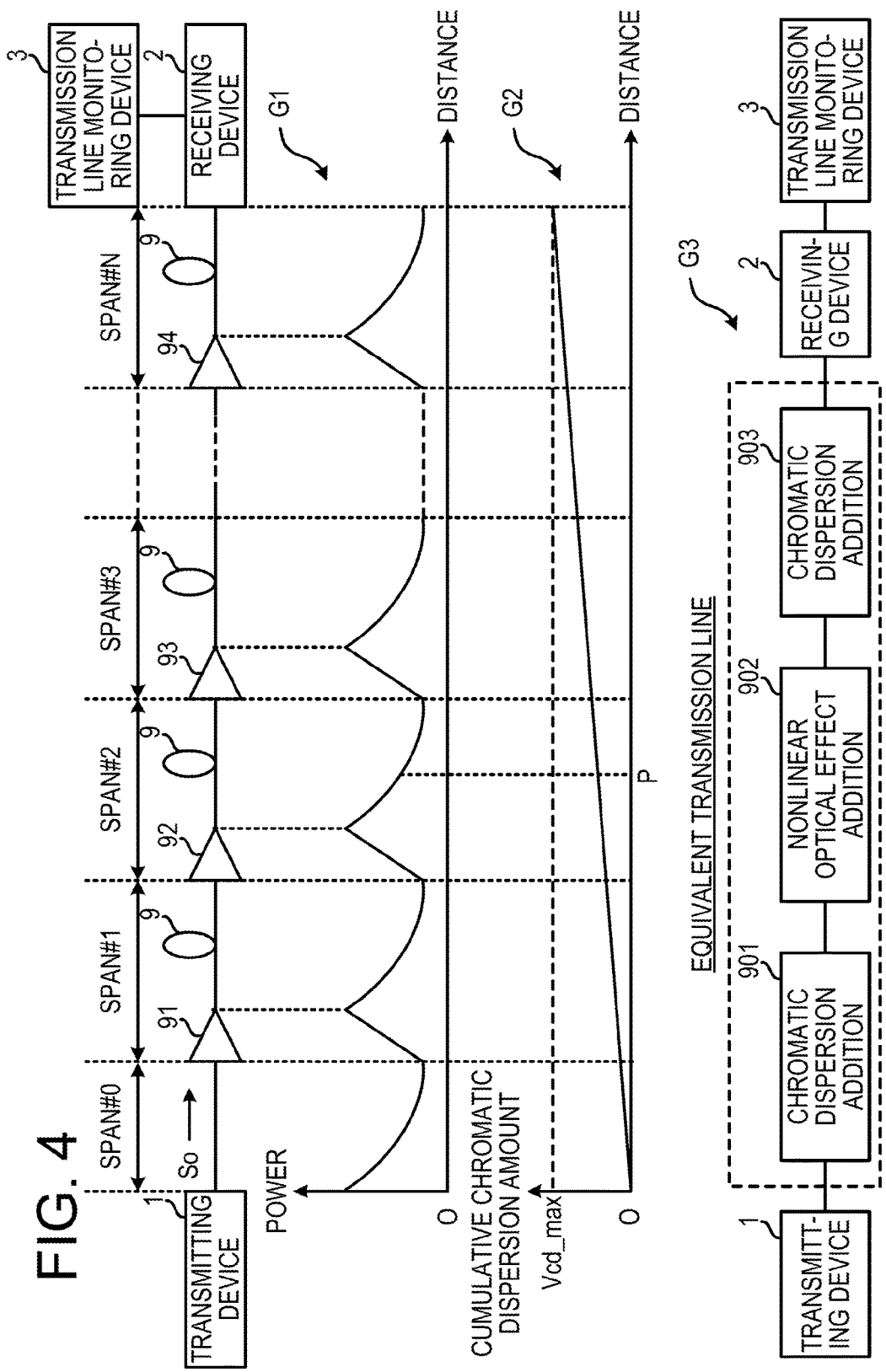
FIG. 4 is a view illustrating the characteristics of a transmission line and an equivalent transmission line.

FIG. 4 is a view illustrating the characteristics of the transmission line 9 and an equivalent transmission line. As one example, optical amplifiers 91 to 94 for amplifying the optical signal So are connected in the middle of the transmission line 9. An example of the optical amplifiers 91 to 94 may include, but is not limited to, an erbium doped optical fiber amplifier (EDFA).

The transmission line 9 is divided into a plurality of sections, that is, spans #0 to #N, by the optical amplifiers 91 to 94. The span #0 is a section between the transmitting device 1 and the input terminal of the optical amplifier 91, and the span #1 is a section between the input terminal of the optical amplifier 91 and the input terminal of the optical amplifier 92. The span #2 is a section between the input terminal of the optical amplifier 92 and the input terminal of the optical amplifier 9, and the span #3 is a section between the input terminal of the optical amplifier 93 and the input terminal of the optical amplifier 94. The span #N is a section between the input terminal of the optical amplifier 94 and the receiving device 2. The spans #4 to #(N−1) are not illustrated in this figure.

Reference symbol G1 indicates an example of a change in power of the optical signal So with respect to a distance from the transmitting device 1 of the transmission line 9. The power of the optical signal So is amplified by the optical amplifiers 91 to 94. Therefore, the power is the highest at the output terminal of the optical amplifier 91 in the span #1 and is the highest at the output terminal of the optical amplifier 92 in the span #2. The power is the highest at the output terminal of the optical amplifier 93 in the span #3 and is the highest at the output terminal of the optical amplifier 94 in the span #N.

In a high power range on the transmission line 9, the nonlinear optical effect remarkably acts on the optical signal So. For example, within a predetermined range from the output terminals of the optical amplifiers 91 to 94, the deterioration of the optical signal So due to the nonlinear optical effect is not negligible.

An example of the nonlinear optical effect may include a Kerr effect. When the Kerr effect occurs, the refractive index of an optical fiber of the transmission line 9 is changed in proportion to the square of the power of the optical signal So. As a result, self-phase modulation (SPM) occurs in the optical signal So, whereby a pulse width is narrowed due to a change in phase velocity of the light, which may cause a signal error.

Reference symbol G2 indicates an example of a change in a cumulative chromatic dispersion amount with respect to a distance from the transmitting device 1 of the transmission line 9. The chromatic dispersion refers to the wavelength dependence of the propagation speed of a light wave in the optical fiber, and the magnitude of the chromatic dispersion increases in proportion to the distance. The chromatic dispersion distorts the waveform of the optical signal So, which may cause a signal error.

Since the chromatic dispersion amount per unit distance of the transmission line 9 is determined by, for example, the type of the optical fiber (e.g., single mode fiber (SMF)), the total chromatic dispersion amount Vcd_max of the transmission line 9 may be calculated in advance by the length of the transmission line 9.

Reference symbol G3 indicates a model in which the transmission line 9 is represented by a mathematically equivalent transmission line. With an attention paid to a position P on the transmission line 9, the equivalent transmission line is represented by a portion 902 which gives a nonlinear optical effect to the optical signal So, and portions 901 and 903 which give chromatic dispersion to the optical signal So before and after the portion 902. Therefore, the characteristic compensation unit 33 may detect information related to the power at the position P on the transmission line 9 by using the chromatic dispersion compensation amount Vcd corresponding to the portion 901 which adds the chromatic dispersion on the transmitting device 1 side, the nonlinear compensation amount γ corresponding to the portion 902 which adds the nonlinear optical effect, and the chromatic dispersion compensation amount Vcd_max-Vcd corresponding to the portion 903 which adds the chromatic dispersion on the receiving device 2 side.

Figure 5:
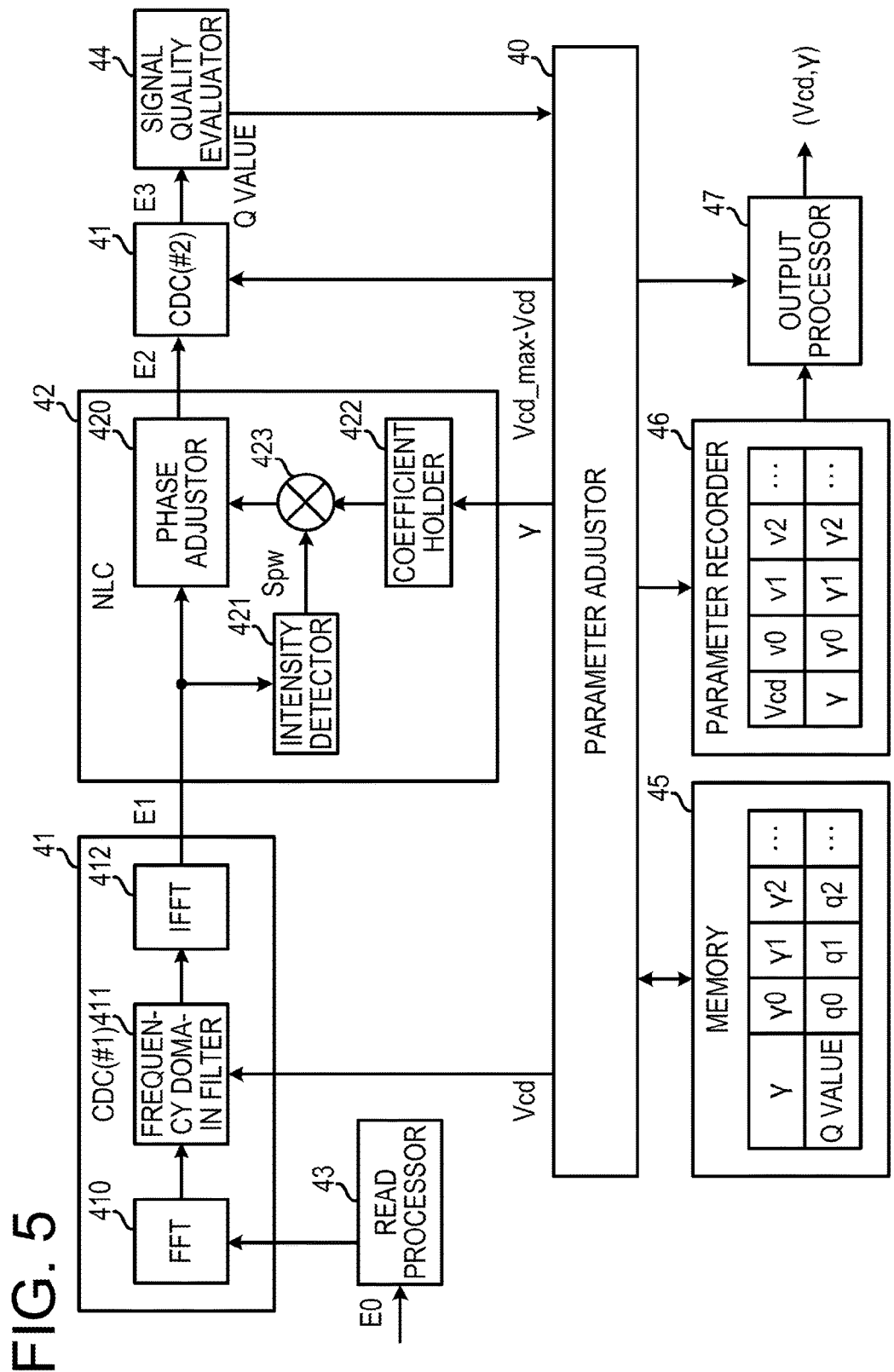
FIG. 5 is a block diagram illustrating an example of the configuration of a characteristic compensation unit.

FIG. 5 is a block diagram illustrating an example of the configuration of the characteristic compensation unit 33. The characteristic compensation unit 33 includes a parameter adjustor 40, chromatic dispersion compensators (CDCs) (#1 and #2) 41, a nonlinear compensator (NLC) 42, a read processor 43, a signal quality evaluator 44, a memory 45, a parameter recorder 46, and an output processor 47.

The read processor 43 reads the signal E0 from the memory 32 and outputs the signal E0 to the CDC (#1) 41. The reading speed of the signal E0 is determined in accordance with, for example, the processing speed of the CDCs 41 and the NLC 42.

The CDC (#1) 41 is an example of a first compensator and compensates a portion of the chromatic dispersion of the transmission line 9 with respect to the signal E0. The CDC (#1) 41 compensates for the chromatic dispersion compensation amount Vcd corresponding to the portion 903 which adds the chromatic dispersion on the receiving device 2 side in the equivalent transmission line.

The CDC (#1) 41 includes a Fast Fourier Transform (FFT) unit 410, a frequency domain filter 411, and an Inverse Fast Fourier Transform (IFFT) unit 412. The FFT unit 410 converts the signal E0 from a signal in the time domain into a signal in the frequency domain.

$$G=\exp(j \cdot (2\pi \cdot fn)^2 \cdot C \cdot Kcd/(2n \cdot Fs^2)/2) \quad (1)$$

The frequency domain filter 411 multiplies the signal E0 by a chromatic dispersion coefficient Kcd for a component of the frequency fn of the signal E0 output from the FFT unit 410. Here, the transfer function G of the frequency domain filter 411 is expressed by the above equation (1). In the equation (1), j represents an imaginary unit, C represents the light speed (299, 792, 458 (m/s)), and Fs represents the frequency of laser of the light source 11.

The chromatic dispersion coefficient Kcd is adjusted by the parameter adjustor 40 according to the chromatic dispersion compensation amount Vcd. Accordingly, the frequency domain filter 411 compensates for the chromatic dispersion corresponding to the chromatic dispersion compensation amount Vcd with respect to the signal E0.

The IFFT unit 412 converts the signal E0 output from the frequency domain filter 411 from a frequency domain signal to a time domain signal E1 which is then compensated by the CDC (#1) 41 and input to the NLC 42.

The NLC 42 is an example of a second compensator and compensates for the deterioration due to the nonlinear optical effect of the transmission line 9 with respect to the signal E1. The NLC 42 compensates for the nonlinear compensation amount γ corresponding to the portion 902 which gives the nonlinear optical effect of the equivalent transmission line.

The NLC 42 includes a phase adjustor 420, an intensity detector 421, a coefficient holder 422, and a multiplier 423. The intensity detector 421 detects the intensity (e.g., power) of the optical signal So from the signal E1. The intensity detector 421 outputs a detection signal Spw indicating the square of the power to the multiplier 423.

The coefficient holder 422 holds the nonlinear compensation amount γ as a nonlinear coefficient. The nonlinear compensation amount γ is adjusted by the parameter adjustor 40. The coefficient holder 422 outputs the nonlinear compensation amount γ to the multiplier 423. The multiplier 423 multiplies a value indicated by the detection signal Spw by the nonlinear compensation amount γ and outputs a calculated value to the phase adjustor 420.

$$H=\exp(-j \cdot \gamma \cdot Pw^2) \quad (2)$$

The phase adjustor 420 adjusts the phase of the signal E1 according to the input value from the multiplier 423. Accordingly, in the signal E1, the phase change amount generated by the self-phase modulation due to the nonlinear optical effect is adjusted by a phase corresponding to the nonlinear compensation amount γ. The phase adjustment amount H is expressed by the above equation (2), assuming that the power of the optical signal So is Pw. The phase adjustor 420 generates a signal E2 by the phase adjustment of the signal E1 and outputs the signal E2 to the CDC (#2) 41.

The CDC (#2) 41 is an example of a third compensator and compensates for the remaining chromatic dispersion, which is obtained by excluding the chromatic dispersion compensation amount Vcd of the CDC (#1) 41 from the chromatic dispersion of the transmission line 9, with respect to the signal E2 compensated by the NLC 42. The CDC (#2) 41 compensates for the chromatic dispersion compensation amount (Vcd_max-Vcd) corresponding to the portion 901 which adds the chromatic dispersion on the transmitting device 1 side in the equivalent transmission line.

That is, the CDC (#2) 41 compensates for the remaining chromatic dispersion (Vcd_max-Vcd) except for the chromatic dispersion compensation amount Vcd of the CDC (#1) 41 among the total chromatic dispersion amount Vcd_max of the transmission line 9. Therefore, the CDC (#1) 41 and the CDC (#2) 41 compensate for the total chromatic dispersion amount Vcd_max of the transmission line 9 in total.

Similarly to the CDC (#1) 41, the CDC (#2) 41 includes an FFT unit 410, a frequency domain filter 411, and an IFFT unit 412. The parameter adjustor 40 adjusts the chromatic dispersion coefficient Kcd of the frequency domain filter 411 according to the chromatic dispersion compensation amount (Vcd_max-Vcd). The CDC (#2) 41 generates a signal E3 by compensating for the chromatic dispersion with respect to the signal E2 and outputs the signal E3 to the signal quality evaluator 44.

The signal quality evaluator 44 is an example of an evaluator and evaluates the quality of the signal E3 compensated by the CDC (#2) 41. The signal quality evaluator 44 calculates the Q value of the signal E3 as an example of the quality. The signal quality evaluator 44 measures, for example, the error rate of the signal E3, and calculates the Q value based on the error rate. The signal quality evaluator 44 outputs the Q value to the parameter adjustor 40.

The parameter adjustor 40 adjusts each of the chromatic dispersion compensation amount Vcd of the CDC (#1) 41, the nonlinear compensation amount γ of the NLC 42, and the chromatic dispersion compensation amount (Vcd_max-Vcd) of the CDC (#2). Accordingly, as an example of an acquisition unit, the parameter adjustor 40 acquires the relationship between the chromatic dispersion compensation amount Vcd of the CDC (#1) 41 and the nonlinear compensation amount γ of the NLC 42 when the Q value of the signal E3 satisfies the predetermined condition. Since the cumulative chromatic dispersion amount of the transmission line 9 is proportional to a distance from the transmitting device 1 as indicated by reference symbol G2 in FIG. 4, the chromatic dispersion compensation amount Vcd of the CDC (#1) 41 may be regarded as a distance from the receiving device 2.

As described above, the nonlinear optical effect becomes conspicuous within a predetermined range from a position where the power of the optical signal So is high, that is, from the output terminals of the amplifiers 91 to 94. Therefore, when the parameter adjustor 40 adjusts the chromatic dispersion compensation amount Vcd to a value corresponding to the position P on the transmission line 9 and adjusts the nonlinear compensation amount γ so that the quality of the signal E3 satisfies the predetermined conditions, the nonlinear compensation amount γ may be regarded as the power of the optical signal So at the position P. An example of the conditions of the quality of the signal E3 may include, but is not limited to, the smallest Q value or a Q value equal to or larger than a threshold value.

For example, for the span #N in FIG. 4, when the chromatic dispersion compensation amount Vcd matches the cumulative chromatic dispersion amount from the output terminal of the amplifier 94 to the receiving device 2, the nonlinear compensation amount γ when the Q value of the signal E3 is the smallest corresponds to the power of the optical signal So at the output terminal of the amplifier 94. For the span #1, when the chromatic dispersion compensation amount Vcd matches the cumulative chromatic dispersion amount from the output terminal of the amplifier 91 to the receiving device 2, the nonlinear compensation amount γ when the Q value of the signal E3 is the smallest corresponds to the power of the optical signal So at the output terminal of the amplifier 91. This is also true of other spans #2 to #(N−1).

Accordingly, it is possible to obtain the change characteristic of the power of the optical signal So for each span from the combination of the chromatic dispersion compensation amount Vcd and the nonlinear compensation amount γ when the quality of the signal E3 satisfies the predetermined conditions. As a result, the transmission line monitoring device 3 may monitor the state of the transmission line 9 for each span.

More specifically, the parameter adjustor 40 acquires the relationship between the chromatic dispersion compensation amount Vcd and the nonlinear compensation amount γ by changing the dispersion compensation amount Vcd of the CDC (#1) 41 every predetermined amount ΔVcd and adjusting the nonlinear compensation amount γ of the NLC 42 every chromatic dispersion compensation amount Vcd such that the Q value becomes the smallest. Therefore, while varying the position on the transmission line 9 corresponding to the chromatic dispersion compensation amount Vcd from the receiving device 2 to the transmitting device 1 or from the transmitting device 1 to the receiving device 2, the parameter adjustor 40 may efficiently search for the nonlinear compensation amount γ for the position when the Q value becomes the smallest.

In addition, the parameter adjustor 40 acquires the relationship between the chromatic dispersion compensation amount Vcd and the nonlinear compensation amount γ, for example, when the Q value becomes the smallest. Therefore, the parameter adjustor 40 temporarily stores the Q value for each nonlinear compensation amount γ in the memory 45, and searches the memory 45 for the nonlinear compensation amount γ at which the Q value becomes the smallest.

In addition, the parameter adjustor 40 records the relationship between the chromatic dispersion compensation amount Vcd and the nonlinear compensation amount γ in the parameter recorder 46. More specifically, a combination of the chromatic dispersion compensation amount Vcd and the nonlinear compensation amount γ when the Q value becomes the smallest is recorded in the parameter recorder 46.

After acquiring the relationship between the chromatic dispersion compensation amount Vcd and the nonlinear compensation amount γ, the parameter adjustor 40 instructs the output processor 47 to output the data recorded in the parameter recorder 46. The output processor 47 reads the data (Vcd and γ) of the combination of the chromatic dispersion compensation amount Vcd and the nonlinear compensation amount γ from the parameter recorder 46 and outputs the data (Vcd and γ) to the data generation unit 34.

Figure 6:
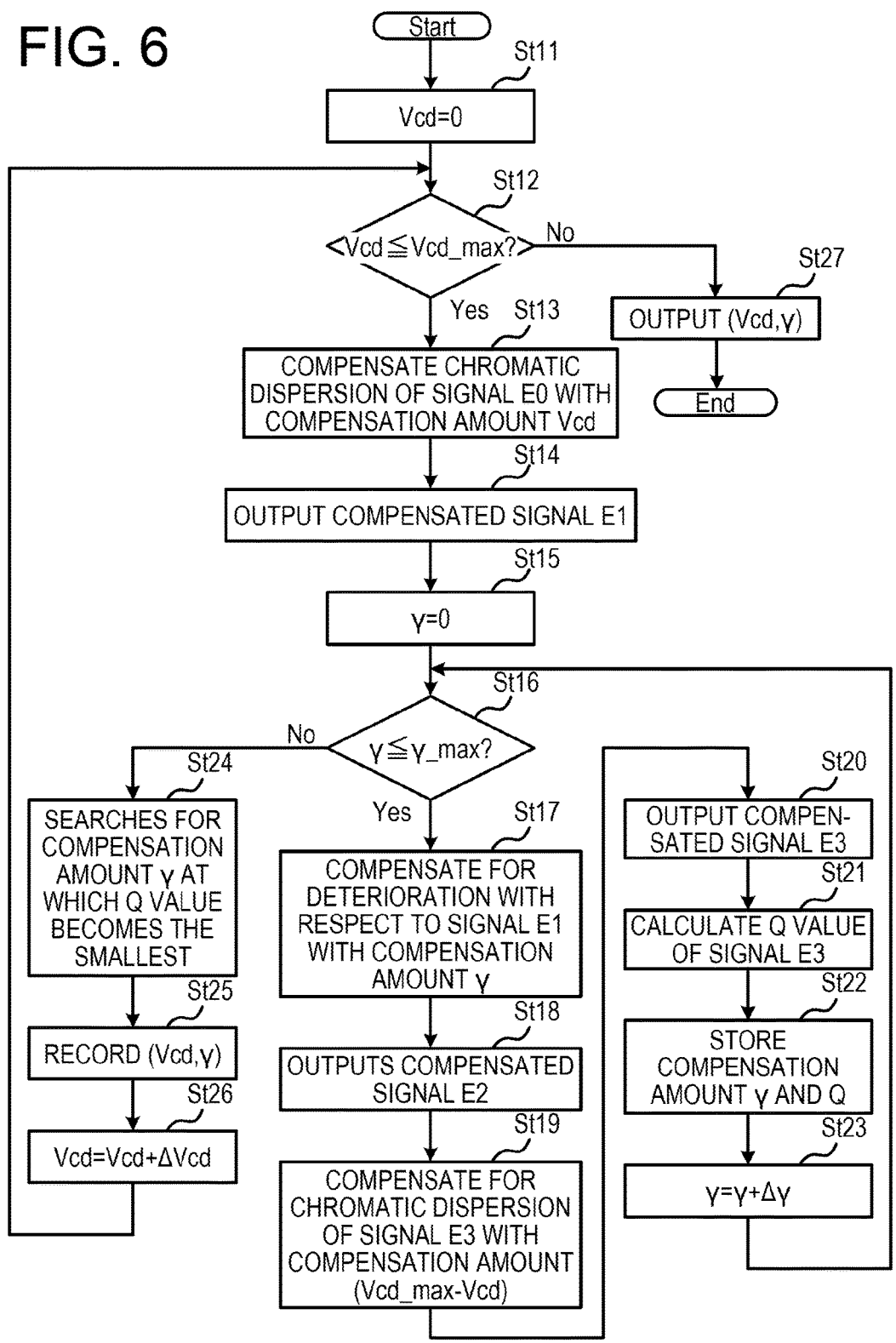
FIG. 6 is a flowchart illustrating an example of the operation of the characteristic compensation unit.

FIG. 6 is a flowchart illustrating an example of the operation of the characteristic compensation unit 33. This operation is executed in the operation St4 of FIG. 3.

The parameter adjustor 40 sets the chromatic dispersion compensation amount Vcd of the CDC (#1) 41 to 0 (operation St11). At this time, the chromatic dispersion compensation amount of CDC (#2) 41 is Vcd_max.

Next, the parameter adjustor 40 compares the chromatic dispersion compensation amount Vcd with the total chromatic dispersion amount Vcd_max of the transmission line 9 (operation St12). When Vcd≤Vcd_max ("Yes" in operation St12), the parameter adjustor 40 causes the CDC (#1) 41 to compensate the chromatic dispersion of the signal E0 with the chromatic dispersion compensation amount Vcd (operation St13). Next, the CDC (#1) 41 outputs the compensated signal E1 to the NLC 42 (operation St14).

Next, the parameter adjustor 40 sets the nonlinear compensation amount γ to 0 (operation St15). Next, the parameter adjustor 40 compares the nonlinear compensation amount γ with a predetermined valueγ_max (operation St16). When γ≤γ_max ("Yes" in operation St16), the parameter adjustor 40 causes the NLC 42 to compensate for the deterioration due to the nonlinear optical effect with respect to the signal E1 with the nonlinear compensation amount γ (operation St17). Next, the NLC 42 outputs the compensated signal E2 to the CDC (#2) 41 (operation St18).

Next, the parameter adjustor 40 causes the CDC (#2) 41 to compensate for the chromatic dispersion of the signal E3 with the chromatic dispersion compensation amount (Vcd_max-Vcd) (operation St19). Next, the CDC (#2) 41 outputs the compensated signal E3 to the signal quality evaluator 44 (operation St20).

Next, the signal quality evaluator 44 calculates the Q value of the signal E3 and outputs the Q value to the parameter adjustor 40 (operation St21). Next, the parameter adjustor 40 stores the nonlinear compensation amount γ and the Q value in the memory 45 (operation St22). Next, the parameter adjustor 40 adds a predetermined amount Δγ (>0) to the nonlinear compensation amount γ (operation St23). Thereafter, the process of the operation St16 is executed again.

When γ>γ_max ("No" in operation St16), the parameter adjustor 40 searches the memory 45 for the nonlinear compensation amount γ at which the Q value becomes the smallest (operation St24). Next, the parameter adjustor 40 records the combination (Vcd and γ) of the nonlinear compensation amount γ and the chromatic dispersion compensation amount Vcd in the parameter recorder 46 (operation St25).

Next, the parameter adjustor 40 adds a predetermined amount ΔVcd (>0) to the chromatic dispersion compensation amount Vcd (operation St26) and then again executes the process after the operation St12. When Vcd>Vcd_max ("No" in operation St12), the parameter adjustor 40 causes the output processor 47 to output data of the combination of (Vcd, γ) (operation St27).

In this manner, the parameter adjustor 40 searches for the nonlinear compensation amount γ at which the Q value becomes the smallest by increasing the chromatic dispersion compensation amount Vcd from 0 to Vcd_max and increasing the nonlinear compensation amount γ from 0 to γ_max in each chromatic dispersion compensation amounts Vcd. In the present embodiment, the parameter adjustor 40 acquires the relationship between the chromatic dispersion compensation amount Vcd and the nonlinear compensation amount γ at which the Q value becomes the smallest. However, the present disclosure is not limited thereto. For example, the parameter adjustor 40 may acquire the relationship between the chromatic dispersion compensation amount Vcd and the nonlinear compensation amount γ at which the Q value becomes equal to or larger than a predetermined value. That is, the parameter adjustor 40 may acquire the relationship between the chromatic dispersion compensation amount Vcd and the nonlinear compensation amount γ at which the quality of the signal E3 is equal to or greater than a predetermined value.

In the present embodiment, the parameter adjustor 40 increases the chromatic dispersion compensation amount Vcd from 0 to Vcd_max. However, the present disclosure is not limited thereto. For example, the parameter adjustor 40 may decrease the chromatic dispersion compensation amount Vcd from Vcd_max to 0. In the present embodiment, the parameter adjustor 40 increases the nonlinear compensation amount γ from 0 to γ_max. However, the present disclosure is not limited thereto. The parameter adjustor 40 may decrease the nonlinear compensation amount γ from γ_max to 0.

Next, an example of monitoring the state of the transmission line 9 by the above-described monitoring method will be described with cases (A) to (C).

FIG. 7 is a table illustrating the ratio of power of the optical signal So for each of positions P1 to P4. The positions P1 to P4 indicate the output ends of the amplifiers 91 to 94 of the spans #1 to #4, respectively, when the number of spans N is 4 in FIG. 4.

When the powers of the positions P1 to P4 are Np1 to Np4, respectively, it is assumed that Np1:Np2:Np3:Np4=1: 1:1:1 in case (A), Np1:Np2:Np3:Np4=1:2:1:0.5 in case (B), and Np1:Np2:Np3:Np4=1:0.5:1:2 in case (C). Results obtained by the transmission line monitoring device 3 of monitoring the transmission line 9 satisfying the respective conditions of cases (A) to (C) are as follows.

Figure 8:
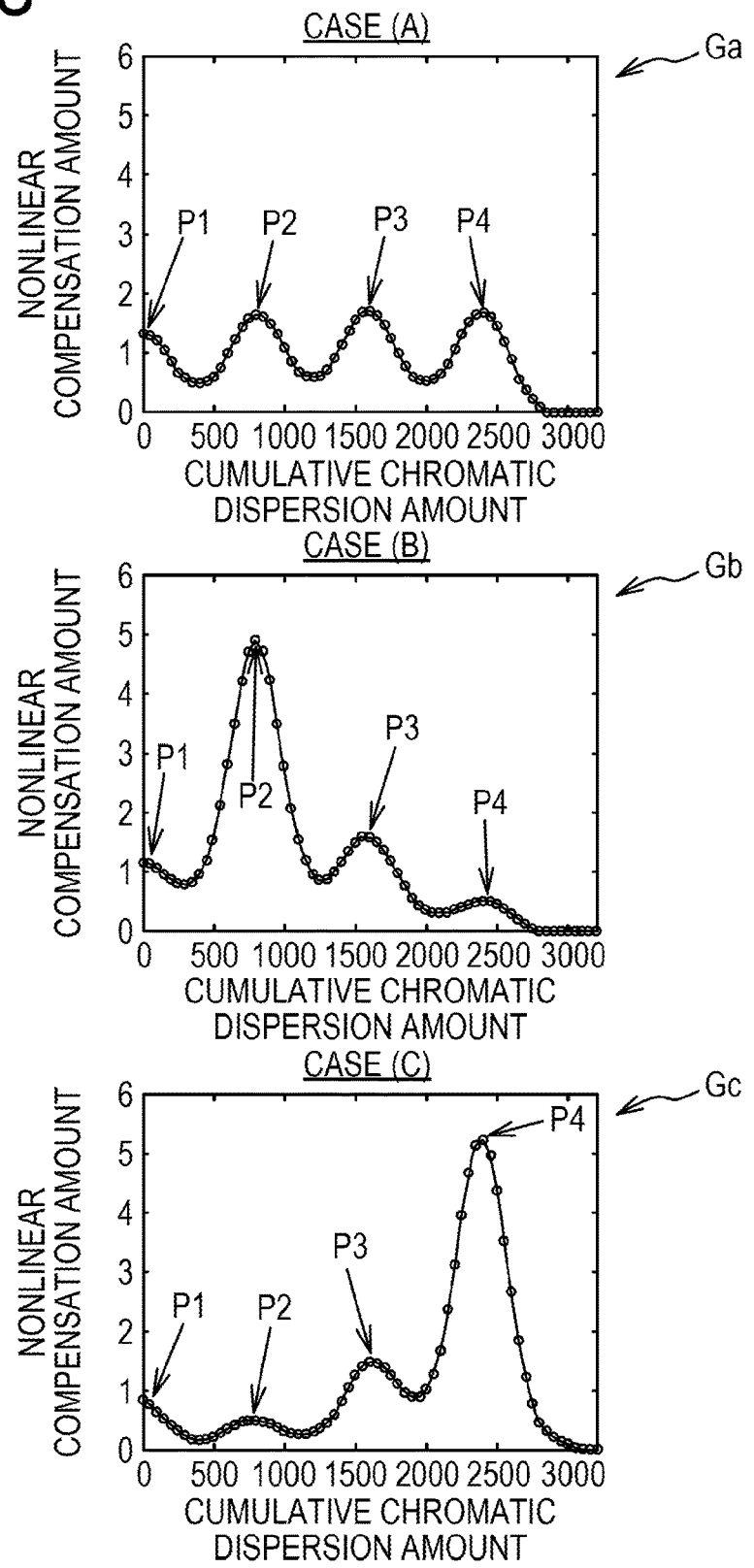
FIG. 8 is a graph illustrating an example of the relationship between a cumulative chromatic dispersion amount and a nonlinear compensation amount.

FIG. 8 is a graph illustrating an example of the relationship between cumulative chromatic dispersion amount and the nonlinear compensation amount. In FIG. 8, the horizontal axis represents the cumulative chromatic dispersion amount of the transmission line 9, and the vertical axis represents the nonlinear compensation amount γ. The cumulative chromatic dispersion amount is a value obtained by subtracting the chromatic dispersion compensation amount Vcd of CDC (#1) 41 from the total chromatic dispersion amount Vcd_max of the transmission line 9.

Since the nonlinear optical effect becomes conspicuous at the positions P1 to P4 where the power of the optical signal So is relatively strong, the nonlinear compensation amount γ also increases at the positions P1 to P4. In case (A), since Np1:Np2:Np3:Np4=1:1:1:1, the nonlinear compensation amounts γ at the positions P1 to P4 are also substantially the same.

In case (B), since Np1:Np2:Np3:Np4=1:2:1:0.5, the nonlinear compensation amount γ at the position P2 is the largest and the nonlinear compensation amount γ at the position P4 is the smallest. In case (C), since Np1:Np2:Np3:Np4=1:0.5: 1:2, the nonlinear compensation amount γ at the position P4 is the largest and the nonlinear compensation amount γ at the position P2 is the smallest.

In this way, the transmission line monitoring device 3 may monitor the power of the optical signal So for each of the spans #1 to #4 from the relationship between the chromatic dispersion compensation amount Vcd and the nonlinear compensation amount γ corresponding to the positions P1 to P4 on the transmission line 9.

The characteristic compensation unit 33 of the present embodiment is not limited to the one illustrated in FIG. 5 but may include a plurality of sets of CDC 41 and NLC 42 connected in series, for example, as will be described below.

Figure 9:
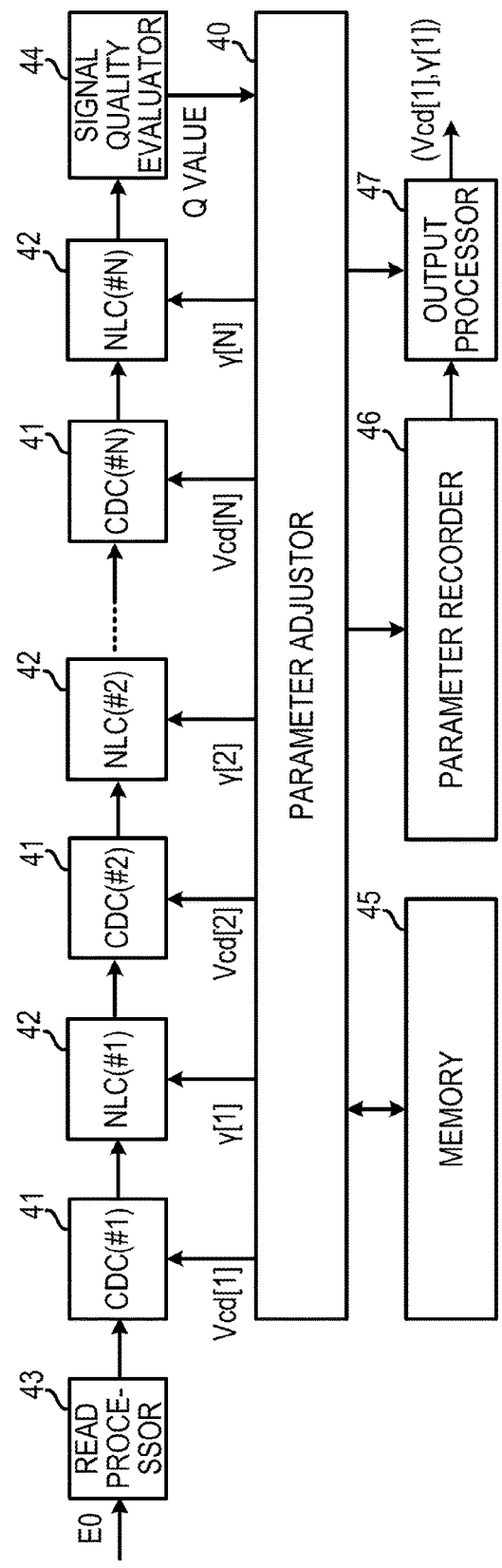
FIG. 9 is a block diagram illustrating another example of the configuration of the characteristic compensation unit.

FIG. 9 is a block diagram illustrating another example of the configuration of the characteristic compensation unit 33. In FIG. 9, the same elements as FIG. 5 will be denoted by the same reference numerals as used in FIG. 5, and explanation of which will not be repeated.

The characteristic compensation unit 33 includes a parameter adjustor 40, N (N: an integer of 2 or more) sets of CDCs (#1 to #N) 41, and NLCs (#1 to #N) 42, a read processor 43, a signal quality evaluator 44, a memory 45, a parameter recorder 46, and an output processor 47. The parameter adjustor 40 adjusts the chromatic dispersion compensation amounts Vcd[1] to Vcd[N] of the CDCs (#1 to #N) 41 and adjusts the nonlinear compensation amounts γ[1] to γ[N] of the NLCs (#1 to #N).

In this example, an equivalent transmission line is regarded as being arranged in series such that a portion 901 (903) which adds N chromatic dispersions and a portion 902 which adds N nonlinear optical effects are alternated. The CDCs (#1 to #N) 41 compensate the chromatic dispersion compensation amounts Vcd[1] to Vcd[N] corresponding to the portion 901 which adds the N chromatic dispersions, respectively, and the NLCs (#1 to #N) 42 compensate the nonlinear compensation amounts γ[1] to γ[N] corresponding to the portion 902 which adds the N nonlinear optical effects.

The parameter adjustor 40 adjusts the chromatic dispersion compensation amounts Vcd[1] to Vcd[N] and the nonlinear compensation amounts γ[1] to γ[N] so as to minimize the Q value. More specifically, while varying the chromatic dispersion compensation amount Vcd[1] by a predetermined amount ΔVcd, the parameter adjustor 40 searches for the chromatic dispersion compensation amounts Vcd[2] to Vcd[N] and the nonlinear compensation amounts γ[1] to γ[N] to minimize the Q value. The CDC (#1) 41 is an example of a first compensator, and the CDCs (#2 to #N) 41 are an example of a third compensator. The NLC (#1) 42 is an example of a second compensator.

The parameter adjustor 40 acquires the relationship between the chromatic dispersion compensation amount Vcd[1] and the nonlinear compensation amount γ[1] when the Q value becomes the smallest, and records the relationship in the parameter recorder 46. The output processor 47 outputs data (Vcd[1] and γ[1]) of a combination of the chromatic dispersion compensation amount Vcd[1] and the nonlinear compensation amount γ[1] to the data generation unit 34.

In this example, since the characteristic compensation unit 33 acquires the relationship between the chromatic dispersion compensation amount Vcd[1] and the nonlinear compensation amount γ[1] by the plural sets of CDCs 41 and NLCs 42, the transmission line 9 may be monitored with higher precision than the embodiment of FIG. 5.

Next, the configuration of the data generation unit 34 will be described. For example, the data generation unit 34 may convert the chromatic dispersion compensation amount Vcd into a position on the transmission line 9 and convert the nonlinear compensation amount γ into the power of the optical signal So. An example of the data generation unit 34 may include a deep neural network.

Figure 10:
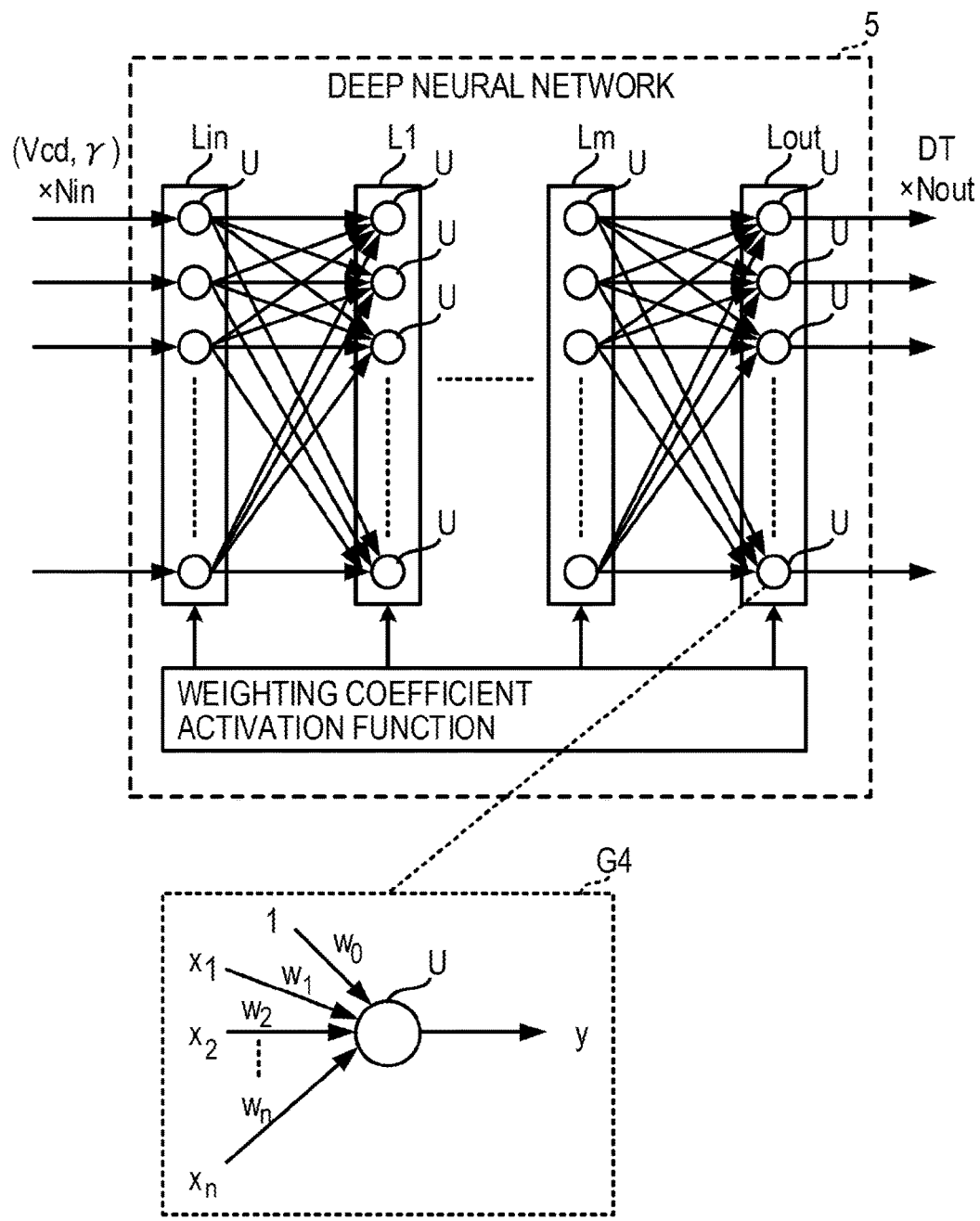
FIG. 10 is a block diagram illustrating an example of the configuration of a deep neural network.

FIG. 10 is a block diagram illustrating an example of the configuration of a deep neural network. The deep neural network 5 is a mathematical model of human brain function and is a network having a deep learning function.

The deep neural network 5 has an input layer Lin, first to $m^{th}$ hidden layers L1 to Lm (m: an integer of 2 or more), and an output layer Lout. A plurality of input/output units U corresponding to neurons are provided in the input layer Lin, the first to $m^{th}$ hidden layers L1 to Lm, and the output layer Lout. The number of input/output units U of the respective layers Lin, L1 to Lm, and Lout may be the same or different.

$$y = f\left(\sum_{k=1}^{n} w_k x_k + w_0\right) \quad (3)$$

The input/output unit U outputs a variable y for input of variables $x_1$ to $x_n$ (n: an integer of 2 or more), as indicated by reference symbol G4. The variable y is expressed by the above equation (3) using an activation function f of the variables $x_1$ to $x_n$. Here, weighting coefficients $w_1$ to $w_k$ and a constant $w_0$ of the variables $x_1$ to $x_n$ are determined by learning. An example of the activation function f may include, but is not limited to, a sigmoid function, a ReLU function or a Maxout function. The weighting coefficients $w_1$ to $w_k$, the constant $w_0$, and the activation function f are preset in the input/output unit U from a central analyzer (not shown).

The data input from the characteristic compensation unit 33 is input to the input layer Lin in Nin columns (Nin: an integer of 2 or more), and arithmetically processed (i.e., converted) in the first to $m^{th}$ hidden layers L1 to Lm into data DT of a different format which are output from the output layer Lout in Nout columns (Nout: an integer of 2 or more). Here, a data conversion rule is determined according to the weighting coefficients $w_1$ to $w_k$ and the constant $w_0$. The weighting coefficients $w_1$ to $w_k$ and the constant $w_0$ may be optimized, for example, by learning the deep neural network 5 with a training system to be described below.

Figure 11:
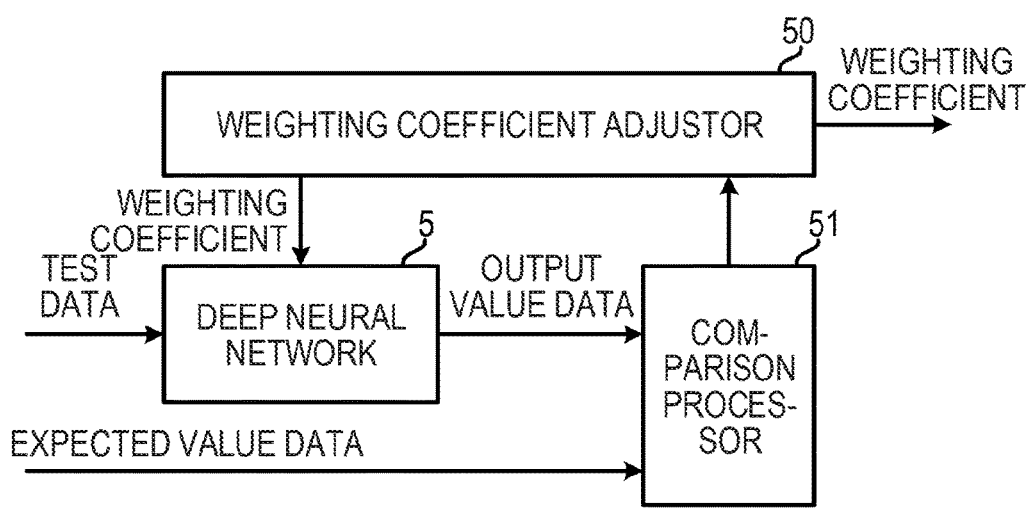
FIG. 11 is a block diagram illustrating an example of the configuration of a training system of the deep neural network.

FIG. 11 is a block diagram illustrating an example of the configuration of a training system of the deep neural network 5. The training system includes a device having a weighting coefficient adjustor 50 and a comparison processor 51, and the deep neural network 5 is connected to the weighting coefficient adjustor 50 and the comparison processor 51. The weighting coefficient adjustor 50 and the comparison processor 51 are configured by hardware such as a FPGA, software for driving a CPU, or a combination of hardware and software.

Test data prepared in advance is input to the deep neural network 5 and output value data is output from the deep neural network 5. The output value data and expected value data are input to the comparison processor 51. The expected value data includes an expected value prepared in advance corresponding to the test data. The comparison processor 51 outputs a comparison result to the weighting coefficient adjustor 50.

$$Ls = (d - d')^2 \quad (4)$$

The comparison processor 51 calculates an error (loss Ls) between the output value data d and the expected value data d', for example, according to the above equation (4) and outputs the error to the weighting coefficient adjustor 50.

The weighting coefficient adjustor 50 adjusts the weighting coefficients $w_1$ to $w_k$ and the constant $w_0$ of the deep neural network 5 by, for example, an error propagation method (back propagation method) so that the loss Ls is reduced. When the loss Ls becomes smaller than a predetermined value, the weighting coefficient adjustor 50 determines the weighting coefficients $w_1$ to $w_k$ and the constant $w_0$, and outputs the weighting coefficients $w_1$ to $w_k$ and the constant $w_0$ to the outside. As a result, appropriate weighting coefficients $w_1$ to $w_k$ and constant $w_0$ may be determined. The initial values of the weighting coefficients $w_1$ to $w_k$ and the constant $w_0$ are, for example, randomly determined.

As the data generation unit 34, a data conversion processor based on a lookup table may be used instead of the deep neural network 5.

Figure 12:
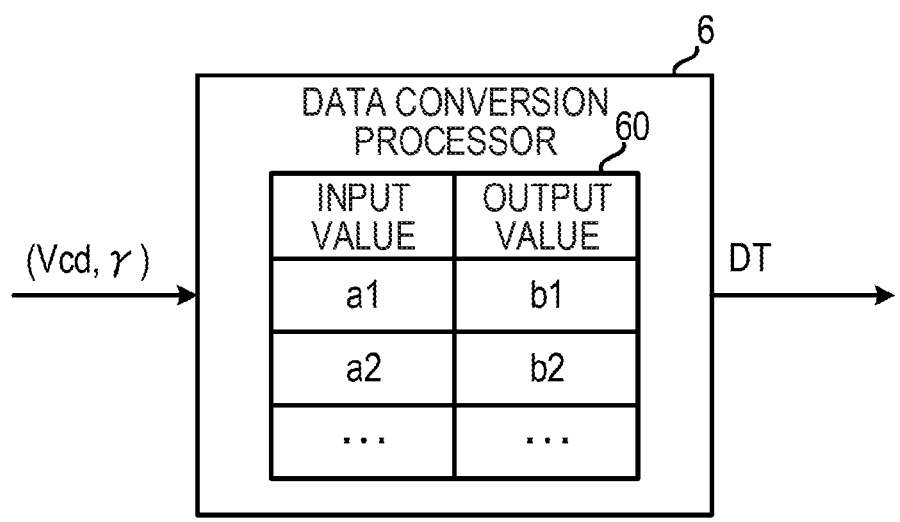
FIG. 12 is a block diagram illustrating an example of the configuration of a data conversion processing unit.

FIG. 12 is a block diagram illustrating an example of the configuration of a data conversion processor 6. The data conversion processor 6 has a lookup table 60 in which the correspondence relationship between input values a1, a2, . . . and output values b1, b2, . . . is registered. The data conversion processor 6 refers to the lookup table 60 to convert the data (Vcd and γ) into the data DT, which enables data conversion with a simple configuration.

In this manner, since the data generation unit 34 converts the data (Vcd and γ) input from the characteristic compensation unit 33 according to a predetermined conversion rule, it is possible to generate the data DT in a format that may be easily analyzed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitor device for monitoring a transmission line, the monitor device comprising:
   a memory; and
   a processor coupled to the memory and the processor configured to:
   compensate for a portion of chromatic dispersion on a plurality of electric signals indicating an electric field component of an optical signal received by a digital coherent reception from the transmission line;
   compensate for deterioration due to a nonlinear optical effect on the plurality of electric signals on which the portion of chromatic dispersion is compensated;
   compensate for a remaining chromatic dispersion except for a first compensation amount of the portion of chromatic dispersion among a total chromatic dispersion amount of the transmission line on the plurality of electric signals on which the deterioration due to the nonlinear optical effect is compensated;
   evaluate quality of the plurality of electric signals on which the remaining chromatic dispersion are compensated;
   acquire the first compensation amount of the portion of chromatic dispersion and a second compensation amount of the deterioration due to the nonlinear optical effect, when the evaluated quality satisfies a predetermined condition; and
   convert the first compensation amount and the second compensation amount into a position on the transmission line and a power of the optical signal at the position, respectively, based on a look-up table in which a correspondence relationship between input values and output values is registered.

2. The monitor device according to claim 1, wherein the processor is further configured to:
   change the first compensation amount by a predetermined amount, and
   adjust the second compensation amount for the changed first compensation amount so that the evaluated quality satisfies the predetermined condition.

3. The monitor device according to claim 1, wherein the plurality of electric signals are held in the memory, and
   wherein the processor is further configured to: read an electric signal held in the memory and compensate for the portion of chromatic dispersion on the electric signal.

4. A monitor method for monitoring a transmission line, the monitor method comprising:
   compensating for a portion of chromatic dispersion on a plurality of electric signals indicating an electric field component of an optical signal received by a digital coherent reception from the transmission line;
   compensating for deterioration due to a nonlinear optical effect on the plurality of electric signals on which the portion of chromatic dispersion is compensated;
   compensating for a remaining chromatic dispersion except for a first compensation amount of the portion of chromatic dispersion among a total chromatic dispersion amount of the transmission line on the plurality of electric signals on which the deterioration due to the nonlinear optical effect is compensated;
   evaluating quality of the plurality of electric signals on which the remaining chromatic dispersion are compensated;
   acquiring the first compensation amount of the portion of chromatic dispersion and a second compensation amount of the deterioration due to the nonlinear optical effect, when the evaluated quality satisfies a predetermined condition, by a processor; and
   converting the first compensation amount and the second compensation amount into a position on the transmission line and a power of the optical signal at the position, respectively, based on a look-up table in which a correspondence relationship between input values and output values is registered.

5. The monitor method according to claim 4, wherein the processor is further configured to:
   change the first compensation amount by a predetermined amount, and
   adjust the second compensation amount for the changed first compensation amount so that the evaluated quality satisfies the predetermined condition.

6. The monitor method according to claim 4, wherein the plurality of electric signals are held in a memory, and
   wherein the processor is further configured to read an electric signal held in the memory and compensate for the portion of chromatic dispersion on the electric signal.

7. A monitor device for monitoring a transmission line, the monitor device comprising:
   a memory; and
   a processor coupled to the memory and wherein the processor is further configured to:
   compensate for a portion of chromatic dispersion on a plurality of electric signals indicating an electric field component of an optical signal received by a digital coherent reception from the transmission line;
   compensate for deterioration due to a nonlinear optical effect on the plurality of electric signals on which the portion of chromatic dispersion is compensated;
   compensate for a remaining chromatic dispersion except for a first compensation amount of the portion of chromatic dispersion among a total chromatic dispersion amount of the transmission line on the plurality of electric signals on which the deterioration due to the nonlinear optical effect is compensated;
   evaluate quality of the plurality of electric signals on which the remaining chromatic dispersion are compensated;
   acquire the first compensation amount of the portion of chromatic dispersion and a second compensation amount of the deterioration due to the nonlinear optical effect, when the evaluated quality satisfies a predetermined condition;
   input test data to a deep neural network by expressed an equation $$y = f\left(\sum_{k=1}^{n} w_k x_k + w_0\right),$$

where x is input data, y is output data, and f is one of a sigmoid function, a ReLU function, or a Maxout function;
   calculate an error between a data outputted from the deep neural network and an expected data;
   adjust weighting coefficients and a constant of the deep neural network by an error propagation method such that the error becomes smaller than a predetermined value; and
   convert the first compensation amount and the second compensation amount into a position on the transmission line and a power of the optical signal, respectively, based on the adjusted weighting coefficients and the adjusted constant of the deep neural network.

\* \* \* \* \*